(12) United States Patent
Shemtov

(10) Patent No.: US 8,129,631 B1
(45) Date of Patent: Mar. 6, 2012

(54) COVER FOR CONDUIT BODY

(76) Inventor: Sami Shemtov, Hollywood, FL (US)

( * ) Notice: Subject to any disclaimer, the term of this patent is extended or adjusted under 35 U.S.C. 154(b) by 225 days.

(21) Appl. No.: 12/719,382

(22) Filed: Mar. 8, 2010

(51) Int. Cl.
*H02G 3/04* (2006.01)

(52) U.S. Cl. ......... 174/481; 174/480; 439/207; 248/300

(58) Field of Classification Search .................. 174/480, 174/481, 96, 68.1, 24; 439/207, 582; 248/300; 52/220.1; 220/3.8
See application file for complete search history.

(56) References Cited

U.S. PATENT DOCUMENTS

| | | | | |
|---|---|---|---|---|
| 4,867,334 | A | * | 9/1989 | Robertson et al. ............. 220/243 |
| 5,621,189 | A | * | 4/1997 | Dodds .............................. 174/50 |
| 7,954,858 | B2 | * | 6/2011 | Pyron .............................. 285/55 |

OTHER PUBLICATIONS

Steel Components Inc. catalog page, "Conduit Bodies with Gasketed Steel Cover".

* cited by examiner

*Primary Examiner* — Dhirubhai R Patel
(74) *Attorney, Agent, or Firm* — Craig A. Fieschko, Esq.; DeWitt Ross & Stevens S.C.

(57) ABSTRACT

An exemplary cover for a conduit body integrates a lid with a gasket. The gasket is a closed loop with an upper rim portion and a lower rim portion forming an inner groove therebetween. The lid includes a hump surrounded by a border, and the border is positioned within the inner groove to secure the lid and the gasket together. The border of the lid has a slight convexity with respect to the bottom side of the lid, providing the lid with a slight curvature toward the conduit body. As a result, the lid bows downward between two fastening points at opposing ends of the lid. The gasket preferably includes a ridge protruding down from the lower rim portion. This ridge also faces the conduit body on which the cover is removably secured.

20 Claims, 6 Drawing Sheets

… …# COVER FOR CONDUIT BODY

FIELD OF THE INVENTION

This document concerns an invention relating to covers that protect electrical wiring and other components housed by conduit bodies.

BACKGROUND OF THE INVENTION

A conduit system includes a set of tubes, pipes, or other conduits for electrical and mechanical wires and connectors. Conduit bodies house electrical or mechanical components at junctions of two or more sections, or at terminal points, of a conduit system. Access to the interior of the conduit system may be provided through a cover that is positioned over a conduit body of the conduit system. The preferably-removable cover is designed to protect the electrical and mechanical components from, for example, external forces and contamination by moisture and dust.

The ability of the cover to effectively protect the components housed by the conduit body depends heavily on the materials and structure of the cover. These characteristics of covers determine what external forces can be withstood and how well the cover forms a seal with the conduit body. The better the seal that is made between the cover and the conduit body, the better the protection against undesired moisture and contaminants. What is needed is a cover for a conduit body that makes a superior seal with the conduit body and provides enhanced protection of the components housed by the conduit body.

SUMMARY OF THE INVENTION

The invention, which is defined by the claims set forth at the end of this document, is directed to covers for conduit bodies which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following the Summary of the Invention section of this document).

Referring initially to FIG. 1, an exemplary cover 100 is shown secured to a conduit body 110 using two fasteners. Here, the two fasteners include first and second screws 120a and 120b and first and second washers 130a and 130b. The cover 100 includes a lid 140 and a gasket 150. The lid 140 is preferably made of a metal or plastic, and the gasket 150 is preferably made of an elastomer such as rubber.

As can be seen in FIG. 3, the lid 140 has a top lid side 160 and a bottom lid side 170. The lid 140 includes a hump 180 that protrudes upward and is convex with respect to the top lid side 160 of the lid 140. The hump 180 of the lid 140 is surrounded by a border 190. The border 190 of the lid 140 is preferably flat, and includes a first lid aperture 200a at a first end 320a and a second lid aperture 200b at a second end 320b. The first lid aperture 200a and the second lid aperture 200b provide points of entry for the first screw 120a and the second screw 120b, respectively, and serve as fastening points for attaching the cover 100 to the conduit body 110.

As can be seen in the side view of FIG. 5, the border 190 around the hump 180 is preferably bowed downward between the first lid aperture 200a and the second lid aperture 200b (that is, between the two fastening points). The border 190 is thus preferably convex with respect to the bottom lid side 170 of the lid 140.

Returning to FIG. 3, a gasket rim 210 forms a closed loop around the perimeter of the gasket 150. The gasket 150 includes a top rim portion 220, and a bottom rim portion 230 adjoining and opposing the top rim portion 220. The top rim portion 220 and the bottom rim portion 230 form an inner groove 240. As shown in FIGS. 7A and 7B, respectively, when the lid 140 and the gasket 150 are assembled, the border 190 of the lid 140 fits into the groove 240 of the gasket rim 210. In FIGS. 7A and 7B, the top rim portion 220 and the bottom rim portion 230 at least partially cover the top border surface 250 (see FIG. 3) and the bottom border surface 260 (see FIG. 4), respectively, of the border 190.

As shown in FIGS. 3 and 4, the ends 310a and 310b of the gasket 150 may optionally include gasket flanges 270a and 270b, respectively, extending from the bottom rim portion 230 toward the opposite end. The first gasket flange 270a and the second gasket flange 270b may include a first gasket aperture 280a and a second gasket aperture 280b, respectively, for the first screw 120a and the second screw 120b that enter through the first lid aperture 200a and the second lid aperture 200b, respectively.

As shown in FIG. 7A, the bottom rim portion 230 of the gasket 150 may additionally include a ridge 290 protruding downward from the gasket 150. The ridge 290 on the bottom rim portion 230 of the gasket 150 preferably makes contact with the top of the conduit body 110 when the cover 100 is secured to the conduit body 110.

The exemplary cover 100 provides enhanced protection for a conduit body 110. The lid 140 shields the components housed by the conduit body against pressure, impacts, and other potentially-damaging forces. The gasket 150 helps form a superior seal between the conduit body 110 and the lid 140, keeping out contaminants such as moisture and dust from the electrical wiring and other components housed in the conduit body 110. The design of the exemplary lid 140 and the exemplary gasket 150 of the cover 100 thus enhance the shielding and sealing functionality provided for a conduit body 110.

Further advantages and features of the invention will be apparent from the remainder of this document in conjunction with the associated drawings.

DETAILED DESCRIPTION OF PREFERRED VERSIONS OF THE INVENTION

Continuing the discussion of the Summary of the Invention section, the lid 140 and the gasket 150 can be elongated as shown in the figures, or they can alternatively be shaped as appropriate to fit over any conduit body 110. The overall shape of the cover 100 preferably mirrors the overall shape of the top opening of the conduit body 110 so that the cover 100 can provide an effective seal against moisture and contaminants.

Figure 4:
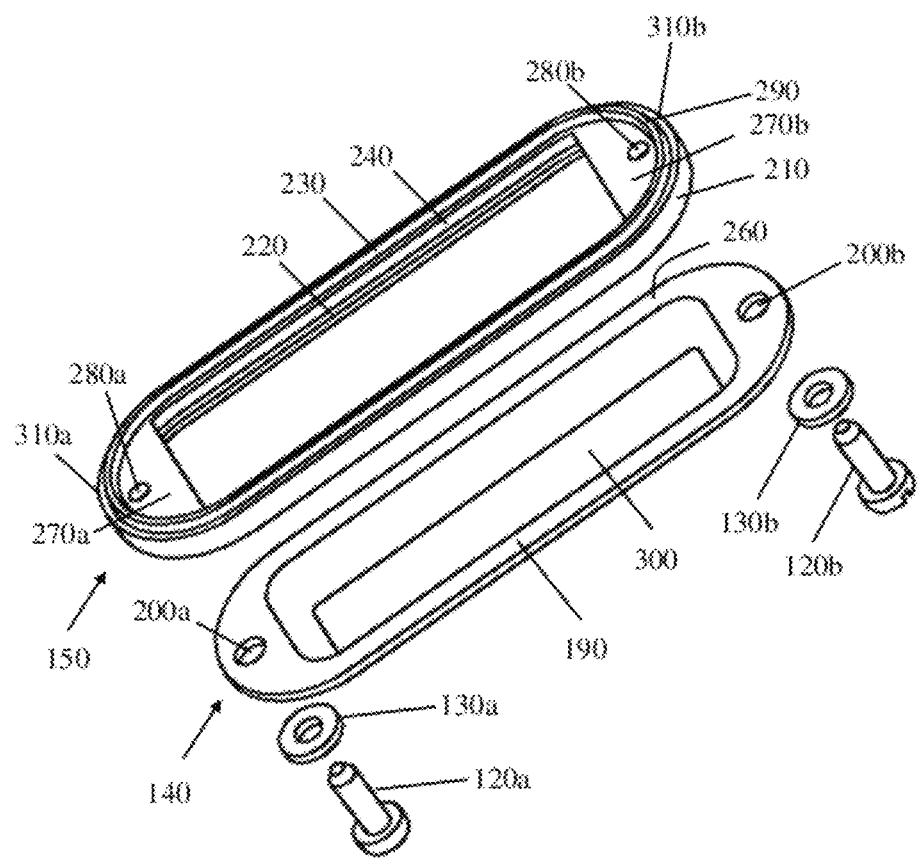
FIG. 4 is an exploded bottom view of the cover of FIG. 1.

The hump 180 of the lid 140 can be adjusted to provide the desired space and volume in a hump interior 300, shown in FIG. 4. The hump 180 can be rectangular, curved, smaller, larger, or otherwise shaped to provide the desired enclosure within the hump interior 300. The hump interior 300 between the lid 140 and the conduit body 110 provides space for the components housed in the conduit body 110. The hump 180 also adds a buffering and protective distance between the exterior of cover 100 and the housed components in case an impact or other force deforms the lid 140.

Figure 1:
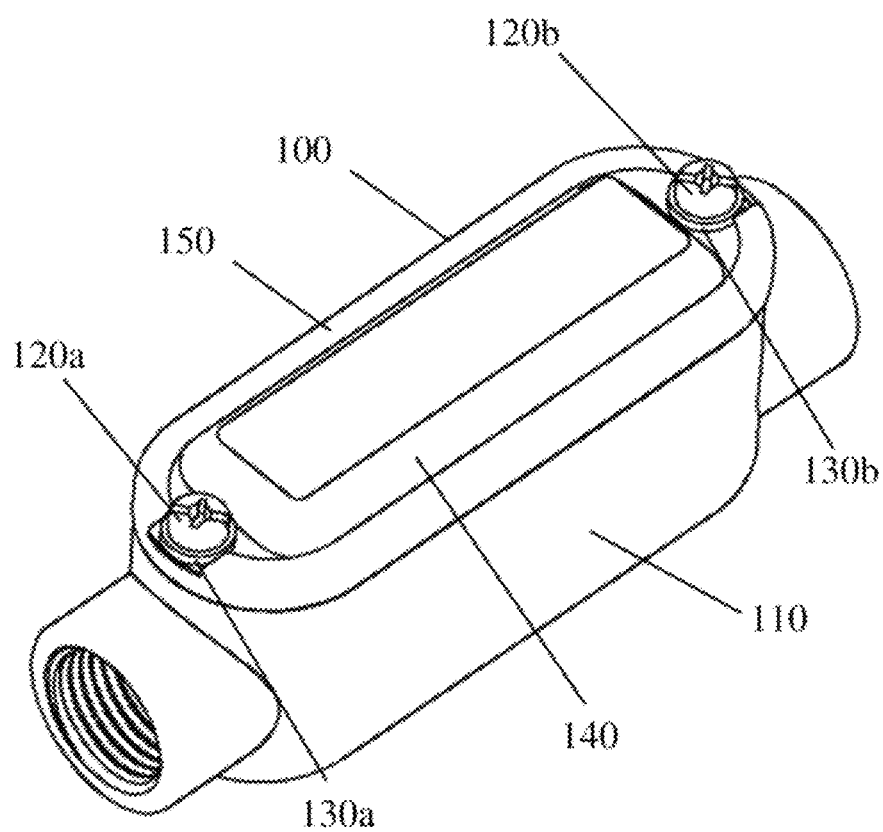
FIG. 1 is a perspective top view of an exemplary cover secured to a conduit body.
Figure 2:
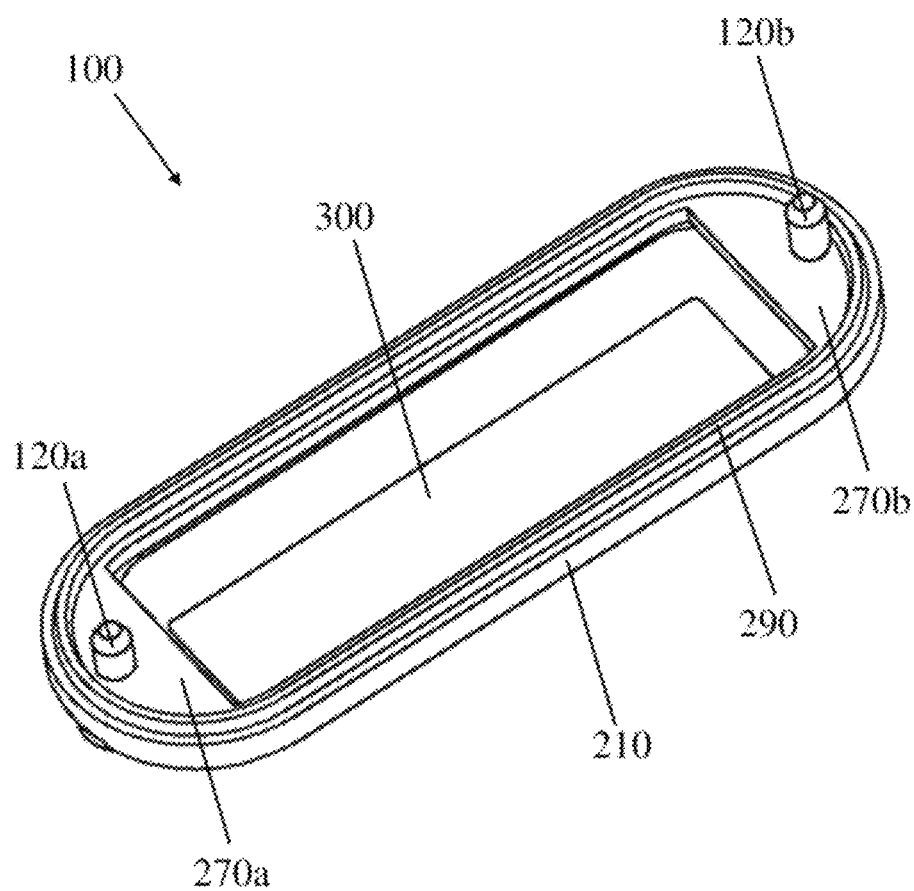
FIG. 2 is a perspective bottom view of the cover of FIG. 1.
Figure 3:
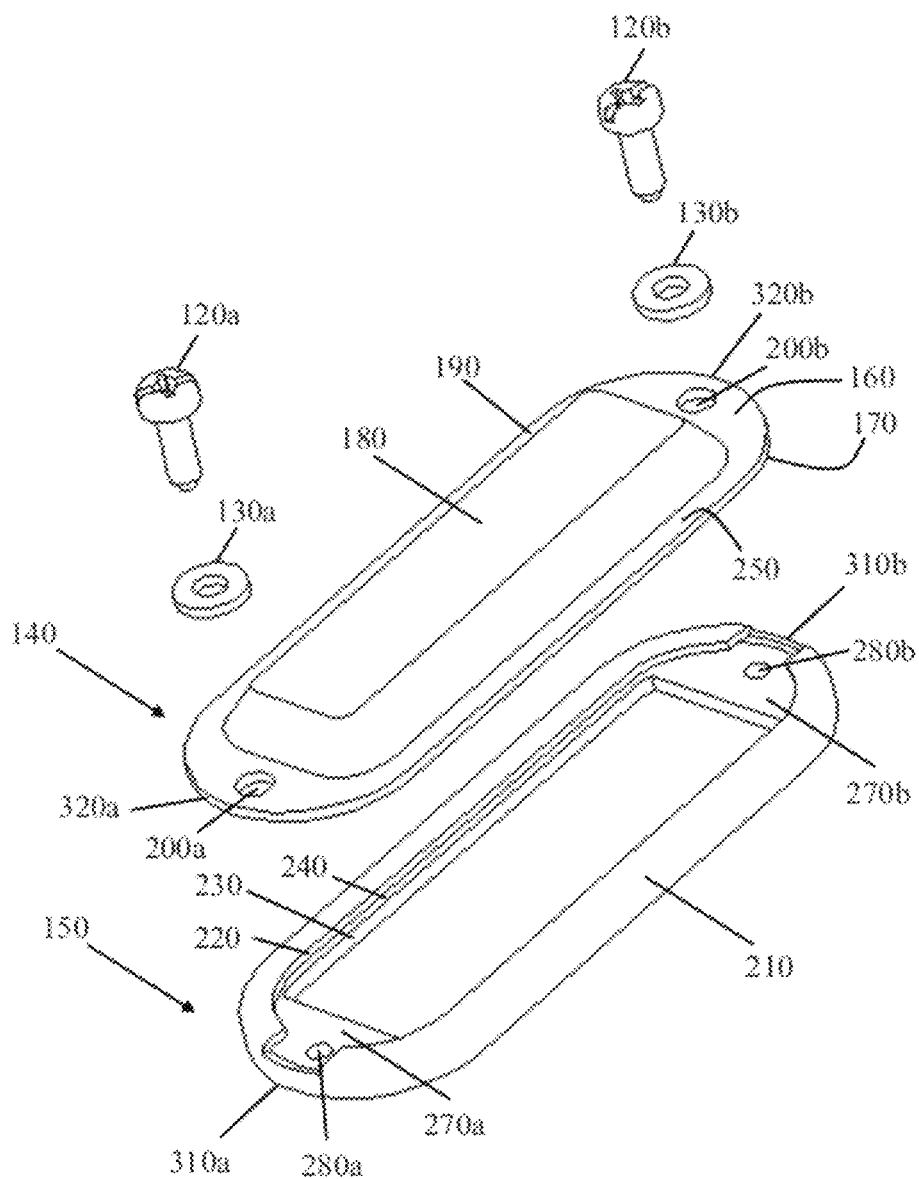
FIG. 3 is an exploded top view of the cover of FIG. 1.

Referring to FIGS. 2 and 3, the two gasket flanges 270a and 270b in the bottom rim portion 230 of the gasket 150 are optional. The gasket 150 thus need not have the first gasket aperture 280a and the second gasket aperture 280b. Even without the flanges 270a and 270b, the gasket 150 would nonetheless have the inner groove 240 formed between the upper rim portion 220 and the bottom rim portion 230. Consequently, gasket 150 could be held together with lid 140 by virtue of the placement of the border 190 within the inner groove 240, without the use of fasteners inserted through the gasket apertures 280a and 280b. A cover 100 incorporating a gasket 150 without the flanges 270a and 270b would be secured to the conduit body 110 by the screws 120a and 120b being inserted through the lid apertures 200a and 200b, respectively, without being inserted through the gasket apertures 280a and 280b.

Figure 5:
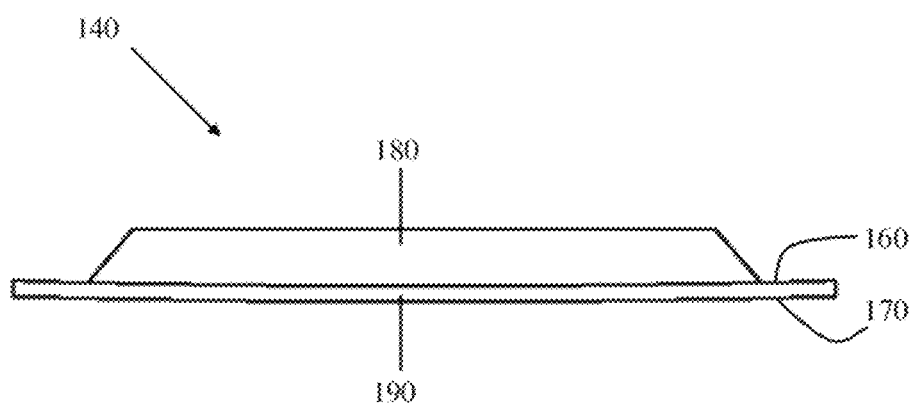
FIG. 5 is a side view of the exemplary lid that is incorporated in the cover of FIG. 1.
Figure 6A:
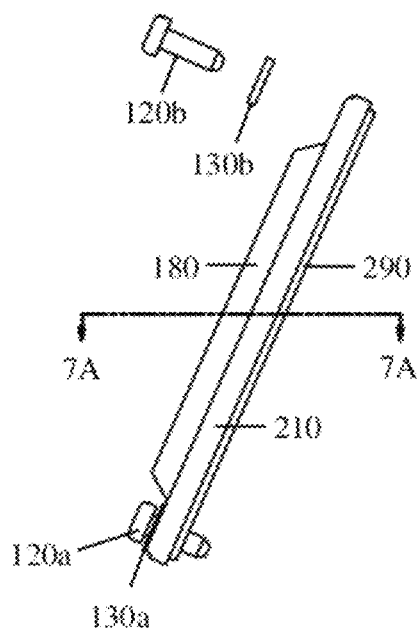
FIG. 6A is a side view of the cover of FIG. 1, depicting a first plane 7A-7A.
Figure 6B:
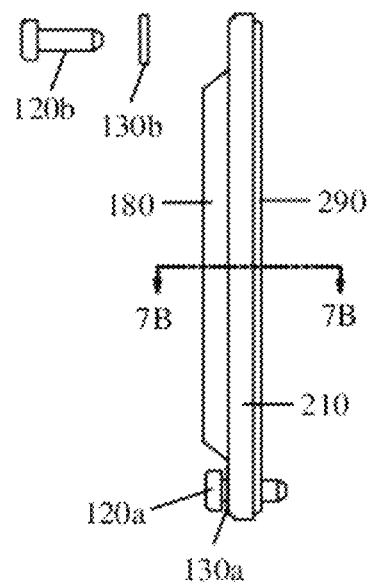
FIG. 6B is the side view of FIG. 6A angled to depict a second plane 7B-7B.
Figure 7A:
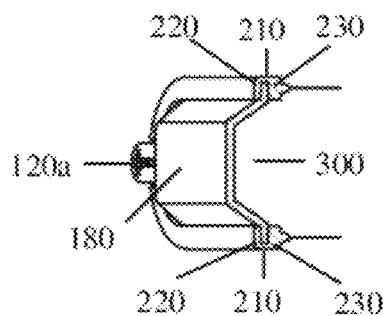
FIG. 7A is a cross-section view of the cover of FIG. 1 along the first plane, as depicted in FIG. 6A.
Figure 7B:
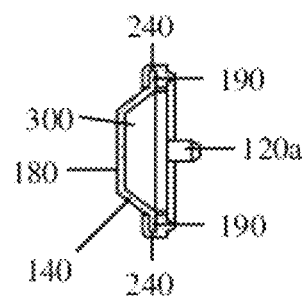
FIG. 7B is a cross-section view of the cover of FIG. 1 along the second plane, as depicted in FIG. 6B.

The slightly bowed border 190 depicted in FIG. 5 can vary in the degree of its curvature. In other words, the extent of the bowing, or the convexity with respect to the bottom lid side 170, can be adjusted as deemed appropriate. It is noted that the small curvature of the border 190 is downward, and because the bottom lid side 170 faces the conduit body 110, the small curvature is toward the conduit body 110 when the cover 100 is secured to the conduit body 110. Here, the convexity of the border 190 with respect to the bottom lid side 170 is shown to be much smaller than the convexity of the hump 180 with respect to top lid side 160. The relative convexities and curvatures, however, can be adjusted as deemed appropriate.

The fasteners depicted in the figures are shown to include screws 120a and 120b, and washers 130a and 130b. The cover 100, however, need not be fastened to conduit body 110 using screws. For example, the cover may alternatively be welded, nailed, glued, or secured to the conduit body 110 in any manner deemed appropriate. The exemplary use of screws 120a and 120b provides a cover that is easily secured to the conduit body and conveniently removable.

The ridge 290 in the figures is shown forming an uninterrupted closed loop around the gasket 150. The ridge 290 is also shown to be laterally positioned at the center of the bottom rim portion 230 of gasket rim 210. However, the ridge 290 may be broken up so as to incorporate one or more gaps as it loops around the bottom rim portion 230. Additionally, the ridge need not be laterally centered along the bottom rim portion 230, and may instead be positioned closer to or farther from the hump 180, as desired.

It should be understood that various terms referring to orientation and position are used throughout this document—for example, "top" (as in "top lid side" or "top rim portion") and "downward" (as in "the border 190 around the hump 180 is preferably bowed downward" and "a ridge 290 protruding downward from the gasket 150")—are relative terms rather than absolute ones. In other words, it should be understood (for example) that the top rim portion being referred to may in fact be located at the bottom depending on the overall orientation of the apparatus. Thus, such terms should be regarded as words of convenience, rather than limiting terms.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A conduit system including a conduit body and a lid, wherein:
    a) the lid includes:
        1) a primary plane;
        2) a lid upper side facing upward, and an opposing lid lower side facing downward;
        3) a hump protruding upwardly from the primary plane; and
        4) a border surrounding the hump;
    b) the border extends from a first lid end to an opposing second lid end; and
    c) the border is convex to bow downwardly from the primary plane as the border extends between the first lid end and the second lid end so as to enhance a seal against contaminants when the lid is secured to the conduit body with the lid lower side contacting the conduit body.

2. The conduit system of claim 1 further including a gasket, wherein:
    a) the gasket forms a closed loop, and
    b) the gasket surrounds the border of the lid.

3. The conduit system of claim 2, wherein:
    a) the border further includes:
        1) a top border surface facing upward; and
        2) a bottom border surface facing downward,
    b) the gasket further includes a gasket rim, the gasket rim including:
        1) a top rim portion; and
        2) a bottom rim portion opposing the top rim portion, the bottom rim portion adjoined to the top rim portion,
    c) the top rim portion at least partially covers the top border surface, and
    d) the bottom rim portion at least partially covers the bottom border surface.

4. The conduit system of claim 2, wherein:
    a) the gasket includes a top gasket surface and a bottom gasket surface opposing the top gasket surface, and
    b) the bottom gasket surface includes a ridge.

5. The conduit system of claim 2, wherein the lid further includes a first lid aperture at the first lid end and a second lid aperture at the second lid end.

6. The conduit system of claim 5,
    a) further including:
        1) a first fastener inserted through the first lid aperture; and
        2) a second fastener inserted through the second lid aperture;
    b) wherein:
        1) the first fastener and the second fastener secure the lid to the conduit body, and
        2) the lid lower side faces the conduit body.

7. The conduit system of claim 5, wherein:
    a) the gasket further includes:

1) a first gasket end and a second gasket end opposite the first gasket end; and
2) a first gasket aperture at the first gasket end and a second gasket aperture at the second gasket end,
b) the conduit body further includes:
1) a first fastener inserted through the first lid aperture and the first gasket aperture; and
2) a second fastener inserted through the second lid aperture and the second gasket aperture;
c) the first fastener and the second fastener secure the lid to the conduit body.

8. A conduit system,
a) the conduit system including:
1) a lid having a top lid surface and a bottom lid surface opposing the top lid surface;
2) a gasket having a top gasket surface and a bottom gasket surface opposing the top gasket surface, the gasket having at least a border portion of the lid positioned between the top gasket surface and the bottom gasket surface; and
3) a conduit body;
b) wherein:
1) the lid and the gasket are secured to the conduit body, with the bottom gasket surface contacting the conduit body,
2) the top lid surface faces away from the conduit body, and
3) the bottom gasket surface includes a ridge protruding downwardly toward the conduit body to enhance a seal from contaminants when the lid and the gasket are secured to the conduit body.

9. The conduit system of claim 8, wherein:
a) the lid further includes a hump, wherein the hump is convex with respect to the top lid surface; and
b) the border portion of the lid is a flat border surrounding the hump.

10. The conduit system of claim 9, wherein the flat border is convex with respect to the bottom lid surface.

11. The conduit system of claim 9, wherein the gasket forms a closed loop surrounding the flat border of the lid.

12. The conduit system of claim 11, wherein the gasket further includes:
a) a top rim portion;
b) a bottom rim portion opposing the top rim portion, the bottom rim portion adjoined to the top rim portion; and
c) a groove between the top rim portion and the bottom rim portion.

13. The conduit system of claim 12, wherein the flat border of the lid is positioned in the groove of the gasket.

14. The conduit system of claim 13, wherein the gasket is secured to the lid as a result of the flat border of the lid being positioned in the groove of the gasket.

15. The conduit system of claim 13, wherein the lid and the gasket are secured to the conduit body using a fastener.

16. A conduit system including:
a) a lid having a top lid surface and a bottom lid surface, the lid including:
1) a first lid end and a second lid end opposite the first lid end;
2) a first lid aperture at the first lid end and a second lid aperture at the second lid end;
3) a hump protruding upwardly, wherein the hump is convex with respect to the top lid surface; and
4) a flat border surrounding the hump, wherein the flat border is convex between the first lid aperture and the second lid aperture with respect to the bottom lid surface;
b) a gasket having a top gasket surface and a bottom gasket surface, the gasket including:
1) a rim having a top rim portion and an adjoining bottom rim portion;
2) an inner groove formed within the rim between the top rim portion and the bottom rim portion; and
3) a ridge protruding from the bottom gasket surface;
c) wherein the flat border of the lid is at least partially:
1) positioned in the inner groove of the gasket, and
2) covered by the rim of the gasket.

17. The conduit system of claim 16,
a) further including:
1) a conduit body;
2) a first fastener; and
3) a second fastener;
b) wherein:
1) the gasket is secured to the lid as a result of the flat border of the lid being positioned in the inner groove of the gasket,
2) the first fastener is inserted through the first lid aperture,
3) the second fastener is inserted through the second lid aperture, and
4) the lid is secured to the conduit body using the first fastener and the second fastener.

18. The conduit system of claim 16, wherein the gasket further includes:
a) a first gasket end and a second gasket end opposite the first gasket end;
b) a first flange from the bottom rim portion, the first flange extending from the first gasket end toward the second gasket end;
c) a second flange from the bottom rim portion, the second flange extending from the second gasket end toward the first gasket end; and
d) a first gasket aperture in the first flange, and a second gasket aperture in the second flange.

19. The conduit system of claim 18, further including a conduit body, wherein:
a) a first fastener is inserted in the first lid aperture and the first gasket aperture,
b) a second fastener is inserted in the second lid aperture and the second gasket aperture, and
c) the first fastener and the second fastener secure the lid and the gasket to the conduit body.

20. The conduit system of claim 19, wherein the bottom gasket surface having the ridge faces the conduit body.

* * * * *